(12) United States Patent
Liu et al.

(10) Patent No.: US 8,180,769 B2
(45) Date of Patent: *May 15, 2012

(54) CONTENT-MANAGEMENT SYSTEM FOR USER BEHAVIOR TARGETING

(75) Inventors: Hongche Liu, Fremont, CA (US); Anand Madhavan, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 11/144,234

(22) Filed: Jun. 2, 2005

(65) Prior Publication Data

US 2006/0020596 A1    Jan. 26, 2006

Related U.S. Application Data

(63) Continuation-in-part of application No. 11/130,592, filed on May 16, 2005, now abandoned.

(60) Provisional application No. 60/576,735, filed on Jun. 2, 2004.

(51) Int. Cl.
*G06F 7/00* (2006.01)

(52) U.S. Cl. ........ 707/732; 707/737; 707/748; 705/14.4

(58) Field of Classification Search .................... 707/10, 707/3, 104.1, 706, 709, 727, 737, 748, 999.01, 707/999.003; 705/14.4
See application file for complete search history.

(56) References Cited

U.S. PATENT DOCUMENTS

| | | | | |
|---|---|---|---|---|
| 5,848,396 | A * | 12/1998 | Gerace | 705/10 |
| 6,098,065 | A * | 8/2000 | Skillen et al. | 707/3 |
| 6,374,237 | B1 * | 4/2002 | Reese | 1/1 |
| 6,539,375 | B2 * | 3/2003 | Kawasaki | 1/1 |
| 6,691,106 | B1 * | 2/2004 | Sathyanarayan | 707/3 |
| 7,047,242 | B1 * | 5/2006 | Ponte | 707/10 |
| 7,693,827 | B2 * | 4/2010 | Zamir et al. | 707/999.003 |
| 2004/0039814 | A1 * | 2/2004 | Crabtree et al. | 709/224 |
| 2004/0093327 | A1 * | 5/2004 | Anderson et al. | 707/3 |
| 2004/0267725 | A1 * | 12/2004 | Harik | 707/3 |
| 2005/0027699 | A1 * | 2/2005 | Awadallah et al. | 707/3 |
| 2005/0131762 | A1 * | 6/2005 | Bharat et al. | 705/14 |

* cited by examiner

*Primary Examiner* — Dennis Truong
(74) *Attorney, Agent, or Firm* — Ostrow Kaufman LLP

(57) ABSTRACT

A system including a plurality of web servers configured to serve base content and relevant content to a user system; a set of additional-content servers configured to serve the relevant content to the web servers if units in the user profile match units associated with the relevant content; a parsing server configured to extract the units in the user profile from the base content requested by the user and generate a ranked list of the units in the user profile; and a unit-matching module configured to determine whether the units in the user profile match units associated with the relevant content if the user requests the base content, wherein the web servers are configured to serve the base content and the relevant content if the units in the user profile match units associated with the relevant content.

38 Claims, 11 Drawing Sheets

| User Profile | User-Identification No.: 120980923490 | |
|---|---|---|
| Units | Revenue Generation | Relevancy |
| light-duty truck | 0.30 | 0.8 |
| pick-up truck | 0.28 | 0.8 |
| truck | 0.10 | 0.9 |
| car | 0.00 | 0.7 |

FIG. 3

| User Profile | User-Identification No.: 120980923490 | | |
|---|---|---|---|
| Units | Revenue Generation | Relevancy | Overall Relevancy |
| light-duty truck | 0.30 | 0.8 | 0.95 |
| pick-up truck | 0.28 | 0.8 | 0.6 |
| truck | 0.10 | 0.9 | 0.4 |
| car | 0.00 | 0.7 | 0.2 |

FIG. 4A

| User Profile | | User-Identification No.: 120980923490 | | |
|---|---|---|---|---|
| Units | Revenue Generation | PPC | CTR | Relevancy |
| light-duty truck | $10.00 | $0.50 | 2% | 0.8 |
| pick-up truck | $8.40 | $0.28 | 3% | 0.8 |
| truck | $5.00 | $0.10 | 5% | 0.9 |
| car | $0.00 | $0.00 | 10% | 0.7 |

FIG. 4B

CONTENT-MANAGEMENT SYSTEM FOR USER BEHAVIOR TARGETING

CROSS-REFERENCES TO RELATED APPLICATIONS

This patent application claims priority to U.S. Provisional Patent Application No. 60/576,735, filed Jun. 2, 2004, titled "CONTENT-MANAGEMENT SYSTEM FOR USER BEHAVIOR TARGETING," and is a continuation-in-part of U.S. patent application Ser. No. 11/130,592, filed May 16, 2005, titled "CONTENT-MANAGEMENT SYSTEM FOR USER BEHAVIOR TARGETING" each of which is incorporated by reference herein in its entirety for all purposes.

BACKGROUND OF THE INVENTION

The present invention relates to content management in general and more particularly to methods and apparatus for associating user behavior with content relevant to the user behavior to present the user with the relevant content.

In a typical content-management system, a user makes a request for base content and receives the base content with additional content that may or may not be relevant to the user. Base content might include a web page the user visits and might be served to a user's client system in a set of search results provided by a search engine. Additional content might include advertisements or the like that are placed on the visited web page by advertisement server or the like. The additional content is often displayed on the visited page in a banner ad that includes a link to the advertiser's Web site.

Content-management systems configured to server base content and additional content are in common use. One common content-management system in use today is referred to as the Internet, a global internetwork of networks, wherein nodes of the network send requests to other nodes that might respond with the base content requested by a user along with additional content. One protocol usable for content-management systems is the Hypertext Transport Protocol (HTTP), wherein an HTTP client, such as a browser, makes a request for base content referenced by a Uniform Resource Locator (URL) and an HTTP server responds to the requests by sending content specified by the URL. Of course, while this is a very common example, content retrieval is not so limited.

For example, networks other than the Internet might be used, such as a token ring, a WAP (wireless application protocol) network, an overlay network, a point-to-point network, proprietary networks, etc. Protocols other than HTTP might be used to request and transport content, such as SMTP (Simple Mail Transfer Protocol), FTP (File Transfer Protocol), etc., and content might be specified by other than URLs. Portions of the present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

Requested base content and relevant content could be in many forms. For example, some content might be text, images, video, audio, animation, program code, data structures, formatted text, etc. The base content and relevant content might be served on a web page, and may be formatted according any one of a number of network page protocols, such as the Hypertext Markup Language (HTML), the Extensible Markup Language (XML), the Standard Generalized Markup Language (SGML) or other language in use at the time.

HTML is a common format used for pages or other content that is supplied from an HTTP server. HTML-formatted content might include links to other HTML content and a collection of content that references other content might be thought of as a document web, hence the name "World Wide Web" or "WWW" given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

A supplier of base content might determine the subject of the base content and/or a user's interests, and provide additional content that is relevant to the base content and or the user's interests. In determining relevant content, the base content provider may maximize a profit, for example, by supplying ads that the user may have an interest in and collecting fees from the advertiser for displaying the advertiser's ads. It is a continuing, expensive problem to correctly determine content that is relevant to a user. One approach to determining and providing content that is relevant to a user is to manually create predefined associations between a user profile of the user and the relevant content. Typically, predetermined associations are manually generated by a person who reads through content and the user profile to determine relevant associations therefor. This approach to generating associations between users and relevant content includes numerous problems in that users are often reluctant and resistant to provide personal information, users fear that his or her personal information may be shared (or sold) with those who may unscrupulously use the personal information. Even when users do provide personal information, the information only provides a static glimpse of a user interests. The information generally does not evolve with a user's changing interests, except possibly through the burdensome task (burdensome on both an information requester and on the user) of periodically requesting and providing new personal.

Another often used approach, which is often fraught with inaccuracy, for associating relevant content with a user is the use demographic information that targets the users. While demographic targeting might provide generalized information that is somewhat relevant, the information might not be sufficiently narrow for targeted advertising specific to individuals in the user's demographic. Just like a user supplied profile, demographic information suffers the fate of becoming stale once a demographic study is completed as the generated demographic data generally does not evolve as a user's interest changes. Such is especially for interests that change on a day-to-day basis or even on an hour-to-hour basis.

What is needed is an improved content-management system for generating a user profile that stays current with a user's evolving interests, and associates the interests with relevant content that is provided to the user in a timely manner.

BRIEF SUMMARY OF THE INVENTION

A content-management system according to embodiments of the present invention associates base content and relevant content. The base content might be served to a user browser along with the relevant content, if the relevant content is relevant to the user, or more specifically, if units, formed of one or more keywords, in a user profile, match units associated with the relevant content.

According to one embodiment, a content-management system is configured to serve base content and relevant content to a user system based on an association of a user profile and the relevant content, wherein the relevant content is relevant to the user. The system includes a plurality of web servers configured to serve the base content and the relevant content to the user system; a set of additional-content servers configured to serve the relevant content to the web servers if units in the user profile match units associated with the relevant content; a parsing server configured to extract the units in the user profile from the base content requested by the user and generate a ranked list of the units in the user profile; and a unit-matching module configured to determine whether the units in the user profile match units associated with the relevant content if the user requests the base content, wherein the web servers are configured to serve the base content and the relevant content if the units in the user profile match units associated with the relevant content. According to a specific embodiment, the parsing server includes: a parsing module configured to parse the base content to generate parsed-base content; a unit-extraction module configured to extract the units in the user profile from the parsed-base content; and a unit-ranking module configured to generate the ranked list of the units in the user profile. The base content might include the content of at least one web page.

According to another embodiment, a system is configured to associate a user profile with relevant content. The system includes a parsing module configured to parse base content requested by a user and to generate parsed-base content; a unit-dictionary module including a plurality of units; a unit-extraction module configured to extract units included in the unit dictionary from the parsed base content, the units extracted from the parsed-base content are referred to as the extracted-units; a unit-ranking module configured to rank the extracted-units based on at least one of relevance scores and revenue-generation amounts respectively associated with the extracted-units, and to generate a ranked list of extracted-units; a user profile associated with the user and including the ranked list; and a unit-matching module configured to generate an association between the user profile and the relevant content if the extracted-units in the ranked lists and units associated with the relevant content match. The unit-matching module might be configured to generate the association between the base content and the relevant content if a highest ranking extracted units and at least one of the units associated with the relevant content match or are in a same set of related units. The relevant content might include advertisements, or might be pointed at by a set of links. The links might include at least one of a sponsor link, an integrated link, and an inside link.

According to another embodiment, a system is configured to serve base content with relevant content to a user system, such that the relevant content is relevant to a user. The system includes a plurality of web servers configured to serve base content and relevant content; a parsing server configured to generate a user profile of units based on base content requested by a user; a unit-matching module configured to generate an association between the user profile and the relevant content if at least one of the units in the user profile and units associated with the relevant content match; and a user system configured to receive the base content and the relevant content served by at least one of the web servers and publish the base content and the relevant content on a web page based on the association.

According to another embodiment of the present invention, a method is provided for serving web content and relevant content that is relevant to a user. The method includes requesting base content from a computer network; extracting a set of units from the base content, the units are referred to as the extracted units; assigning the extracted units respective relevance scores and revenue-generation amounts; ranking the extracted units based on at least one of the relevance scores and the revenue-generation amounts; and forming a user profile that includes a ranked list of the extracted units, the relevance scores, and the revenue generation amounts. According to a specific embodiment, the method further includes parsing the base content to generate parsed-base content, wherein the step of extracting the set of units from the base content includes extracting the set of units from the parsed-base content. According to a specific embodiment, the method further includes storing the user profile in a user-behavior database.

According to another embodiment, a method is provided for serving web content and relevant content that is relevant to a user. The method includes requesting base content from a computer network; and serving the web content with the relevant content if at least one unit in a user profile and at least one unit associated with the relevant content match and if the user requests the web content. The web content might include private content and public content. The private content might include at least one of an e-mail and chat-room discussions.

Other features and advantages of the invention will be apparent in view of the following detailed description and accompanying figures.

BRIEF DESCRIPTION OF THE DRAWINGS

FIG. 3 is an example user profile that might be generated by a unit-ranking module and might be stored in a user-behavior database according to an embodiment of the present invention.

FIG. 4A is an example user profile that might be generated by a unit-ranking module and might be stored in user-behavior database according to another embodiment of the present invention.

FIG. 4B is an example of a user profile that might be generated by a unit-ranking module and might be stored in user-behavior database according to another embodiment of the present invention.

DETAILED DESCRIPTION OF THE INVENTION

Embodiments of the invention will now be described, by way of example, not limitation. It is to be understood that the invention is of broad utility and may be used in many different contexts.

Embodiments of the invention serve base content to a user via her client system and with the base content, additional content is served that is relevant to the user. Base content generally includes content requested by a user and may be served on a web page visited by the user via the user's client system. The base content might further include the web page on which requested content is published. Additional content might include advertisements and/or links to content that are placed on the visited web page. Additional content may be deemed relevant to the user if the additional content is substantially similar to attributes of a user profile associated with the user. The attributes might include keywords, units, categories and the like that are identified in queries the user uses to query a document corpus and the search results returned to the user. The additional content may be substantially similar to the user profile if the additional content includes or is associated with the same or similar keywords, units, categories or the like included in the user profile. These and other embodiments of the present invention are described in further detail below. For convenience, an apparatus configured to associate base content and additional content that is relevant to a user (sometimes referred to simply as relevant content) is described first below, and a method for associating base content with additional content that is relevant to the user is described thereafter.

Figure 1:
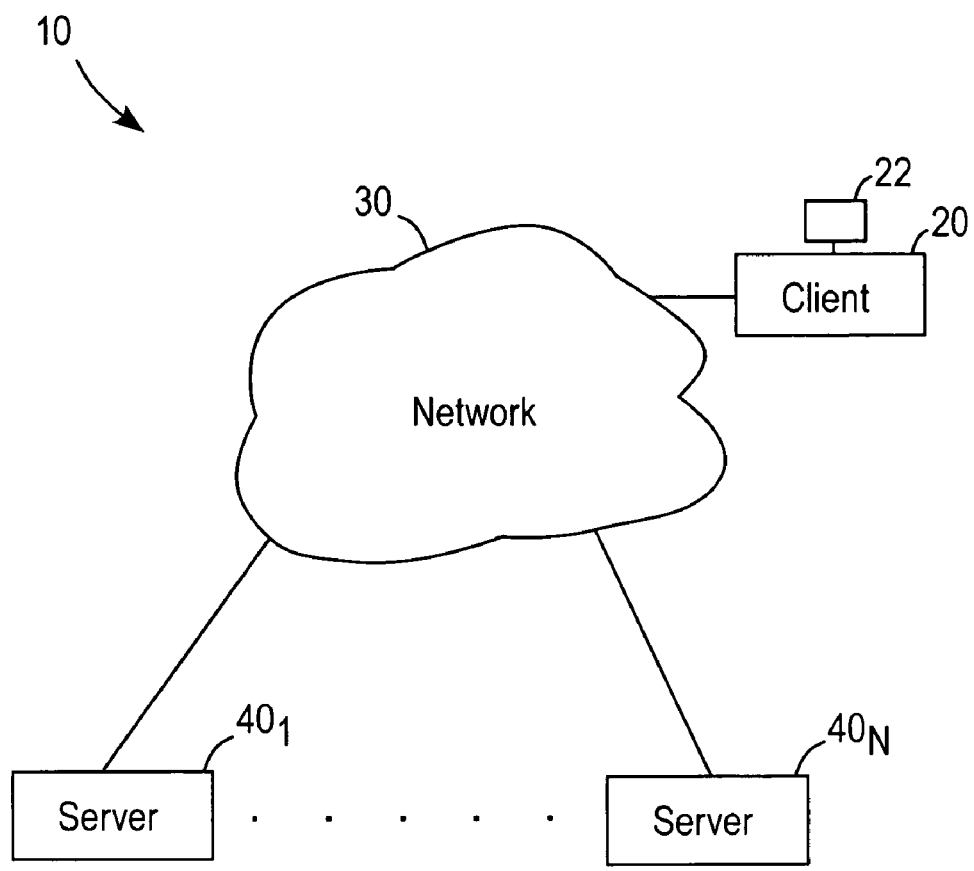
FIG. 1 is an illustration of an information retrieval and communication network including a client system according to an embodiment of the present invention.

FIG. 1 is a simplified illustration of an information retrieval and communication network 10 including a client system 20 according to an embodiment of the present invention. In communication network 10, client system 20 is coupled through a network 30, such as the Internet or an intranet (e.g., a LAN or a WAN), to any number of server systems $40_1$ to $40_N$. As will be described herein, client system 20 is configured according to the present invention to communicate with any of server systems $40_1$ to $40_N$, for example, to access, receive, retrieve and display base content and associated relevant content, for example, in the form of a web page.

Several elements in the system shown in FIG. 1 include conventional, well-known elements that need not be explained in detail here. For example, client system 20 might include a desktop personal computer, workstation, laptop, PDA, cell phone, any wireless application protocol (WAP) enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, a WAP-enabled browser in the case of a cell phone, a PDA or other wireless device, allowing a user of client system 20 to access, process and view content available to it from server systems $40_1$ to $40_N$ over network 30. Client system 20 might also include one or more user interface devices 22, such as a keyboard, a mouse, a roller ball, a touch screen, a pen or the like, for interacting with a graphical user interface (GUI) provided by the browser on a display (e.g., monitor screen, LCD display, etc.), in conjunction with pages, forms and other information provided by server systems $40_1$ to $40_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and system servers $40_1$-$40_N$ and their respective components are operator configurable using an application including computer code run using one or more central processing units, such as those manufactured by Intel, AMD or the like. Computer code for operating and configuring client system 20 to communicate, process and display base content and content relevant to the base content as described herein is preferably downloaded and stored on a hard disk, but the entire program code, or portions thereof, may also be stored on any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $40_1$ to $40_N$ to client system 20 over network 30 using a communication medium and protocols (e.g., TCP/IP, HTTP, HTTPS, Ethernet, or other conventional media and protocols). As referred to herein, a server system may include a single server computer or number of server computers.

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 and/or servers $40_1$-$40_N$ or compiled to execute on client system 20 and/or servers $40_1$-$40_N$. In some embodiments, no code is downloaded to client system 20, and needed code is executed by a server, or code already present at client system 20 is executed.

Figure 2:
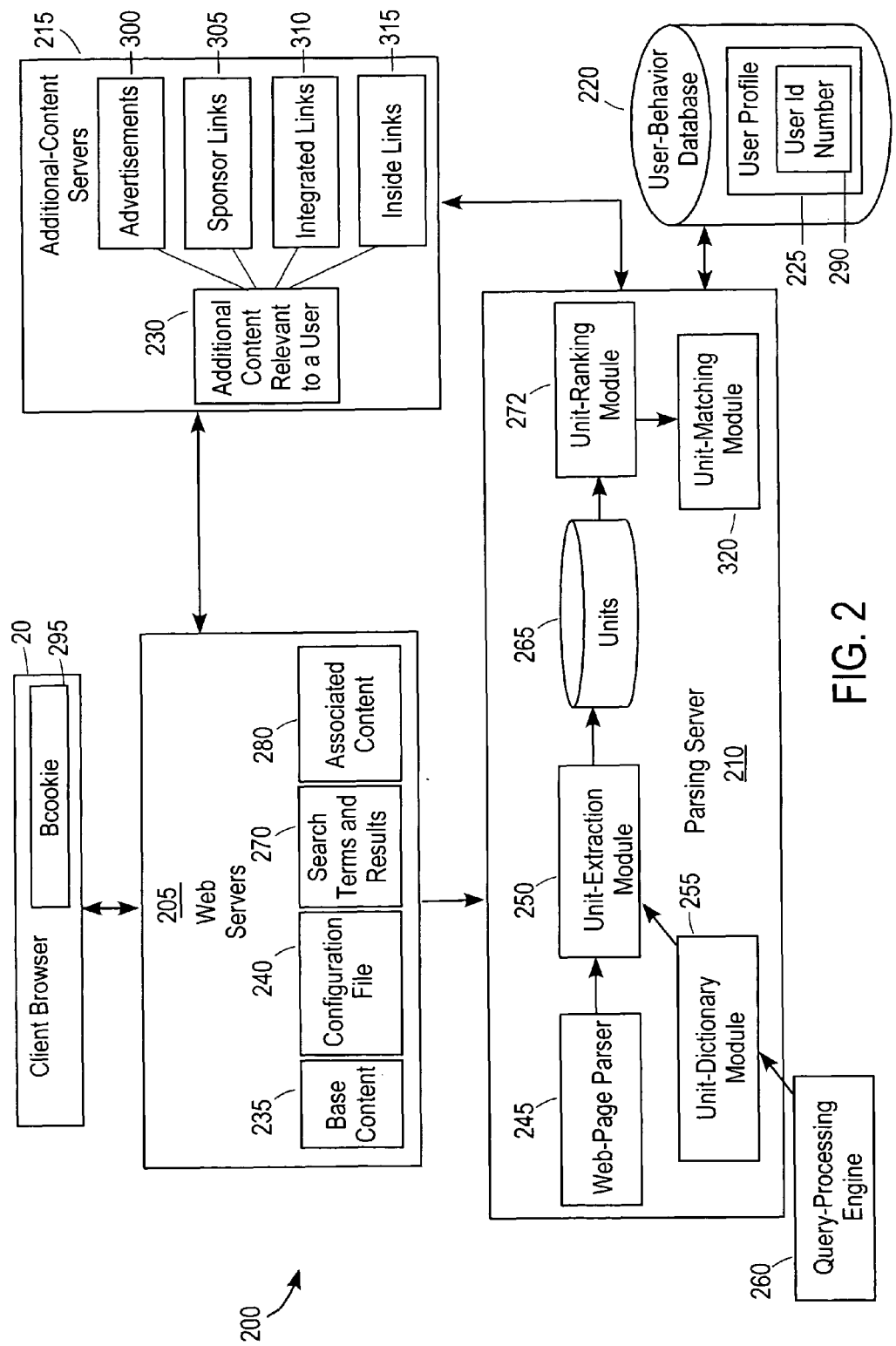
FIG. 2 is an illustration of a content-management system according to an embodiment of the present invention.

FIG. 2 is a simplified illustration of a content-management system 200 according to an embodiment of the present invention. Various portions of the content-management system may reside in one or more servers, such as servers $40_1$ to $40_N$, and/or one or more client systems, such as client system 20. Modules of the content-management system may be transmitted across a network, such as network 30, between one or more servers and client systems for execution. According to one embodiment, content-management system 200 includes a plurality of web servers 205, a parsing server 210, a set of additional-content servers 215, and a user-behavior database 220. A set as referred to herein includes one or more members.

According to one embodiment, content-management system 200 is configured to generate a user profile 225 of a user and to associate the user profile with additional content 230 that is relevant to the user and is served to the user with a piece of content, such base content 235, e-mail, chat-room discussion or the like. The user profile might be generated based on web pages requested by the user, queries used to identify the web pages or the like. The user profile might include units (formed of one or more keywords and described below in detail) extracted from theses pages and/or queries and might include category information used to categorize these units. A user profile might be associated with a piece of additional content based on whether the units that are included in the user profile are the same or similar to units that are included in the additional content, or based on whether categories used to categorize these units are the same or similar. The user profile might be associated with the additional content if the units in the user profile and the additional content substantially match or are in the same category of units. The association between the user profile and the additional content might be formed in response to a user's request for base content or in response to another triggering event. The additional content might be served with the base content if an association is formed.

For convenience, generation of a user profile is described first below, and association of a user profile with addition content is described second below along with description for serving the additional content with a piece of base content or other content. A user profile might be generated based on tracking and parsing the base content that a user requests. Unit may be extracted from the base content and placed in the user profile to build the profile. Units might placed in the user profile may also be extracted from search queries the user performs, for example, using Overture™. Units might also be collected from "associated" content that is associated with primary content. Primary content might be a piece of base content that is of primary interest of a user, such as music, news, TV listing, books, art, etc. Associated content might be associated with the primary content based on the actions of other users or based on logical associations. For example, in a search, a user might be seeking the music of a given artist. The given artist might be the primary topic, or the music of the given artist might be the primary topic. It may be known that users who purchased the music of the given artist also purchased particular pieces of music by another artist. The music of the other artist is an example of associated content, in that it is associated with purchases of music (e.g., primary content) by the given artist (e.g., also primary content). Units associated with the music of the other artist (e.g., name) and/or the other artist's music (e.g., music titles, CD titles, etc) may be included in a user profile.

Base content 235 might include web pages served to client system 20 by one or more web servers 205 or other servers. The web pages may be served according to a number of web-based protocols, such as TPC/IP, HTTP, HTTPS or other protocols in use at the time. System servers $40_1$-$40_N$ may be configured to serve web pages and may include web servers 205. The web servers might include Yahoo! property servers, such as Yahoo! Launch, Yahoo! Finance, Yahoo! Movies, Yahoo! Health, Yahoo! News, Yahoo! Sports, Yahoo! Music, Yahoo! Weather or other web servers. The web servers may reside on single server computer or may reside on a number of server computers. Base content 235 might further include content on a web page, such as text, images, video, audio, animation, program code, data structures, formatted text, etc. For example, base content provided by a news server, such as Yahoo! News, might include a news story (text) and an accompanying image. The base content may be formatted according to the Hypertext Markup Language (HTML), the Extensible Markup Language (XML), the Standard Generalized Markup Language (SGML) or other format in use at the time.

According to one embodiment, base content 235 requested by a user is provided to parsing server 210 by at least one of the web servers 205. Alternatively, the web server might provide a URL to the parsing server; the target of the URL might be the requested base content. The parsing server may be configured to use the URL to retrieve the base contract pointed at by the URL. Base content might be provided to the parsing server in the form of HTML pages, XML pages or other formats in use at the time. Web severs 205 might also provide one or more configuration files 240 to the parsing server. Each configuration file 240 includes a set of rules that is used by a web-page parser 245 to set priorities for base content parsing. Each configuration file might include a unique set of parsing rules that is associated with the web sever providing the rules. For example, a news property, such as the Yahoo! News property, might provide rules for parsing titles of news articles, whereas a music property, such as the Yahoo! Music property, might not provide a rule for parsing titles of new articles. A music property, might alternatively, include a rule for parsing CD titles, which may be of higher relevance to the music property than the titles of new articles. One example set of parsing rules (e.g., for a news property) might include parsing titles, metadata keywords, metadata description, bold text, italicized text, proper nouns, anchor text, body text, and text characterized as important text. During a parsing process, all HTML tags or the like and other unwanted information may be cut from a piece of base content and the preceding text categories parsed from the base content. For example, a body-text-parsing rule might provide for the parsing of the first one or two paragraphs of articles and might provide that subsequent paragraphs not be parsed. According to another example, text characterized as important text that is to be parsed from a web page may be web server (e.g., property server) specific. For example, a sports property, such as the Yahoo! Sports property, may include rules that deem the names of sports teams as important text, whereas, a movie property may include rules that deem movie titles as important text. For base content not provided with a configuration file, such as base content not served by a Yahoo! property server, the base content might be parsed by one or more sets of default rules that might be stored locally in web-page parser 245.

According to one embodiment, subsequent to parsing base content, units are extracted from the parsed-base content by an extraction module 250. Units might include one or more keywords and generally represent a single concept, such as a single concept that is integral to human thought. That is, the keywords in a unit would represent one concept verses the number of concepts that might be represented by the keywords taken individually or in varying groups. For example, the three keywords "New," "York," and "City" might form the unit "New York City," wherein the unit is not treated as three separate keywords (and possibly three or more different concepts) but is treated as a single keyword, or "unit" representing, for example, a single concept. The concept of the unit "New York City" is generally more aligned with natural thinking processes than the concepts of the three keywords contemplated disparately. For example, the keyword York contemplated disparately may be associated with the town of York in Great Britain, or the keywords New York contemplated together may be associated with the state of New York and not necessarily the city of New York.

Units might be extracted by extraction module 250 from parsed text based on a set of units in a unit-dictionary module 255. Unit-dictionary module 255 might include a list of all units that might be extracted from the parsed text. Units in the unit-dictionary module may include one or more keywords. The unit-dictionary module may be provided by a query-processing engine 260. Query-processing engine 260 may be configured to receive a number of keywords and form units from the keywords. The query-processing engine may be configured to recognize that a single keyword may be a unit unto itself and need not be grouped with other keywords to form a unit. While the query-processing engine is shown in FIG. 2 as a module that is not included in parsing server 210, according to some embodiments, the query-processing engine may be included in the parsing server. For a detailed understanding of query processing engine 260, see U.S. Pat. No. 7,051,023 [U.S. patent application Ser. No. 10/713,576, filed Nov. 12, 2003, entitled "System and Methods for Generating Concept Units from Search Queries"], which is incorporated herein by reference for all purposes and is owned by the owner of the presently described invention.

Units may be periodically added to or deleted from the unit-dictionary module, for example as units and/or keywords are sold to advertisers and/or sponsors. For example, an advertiser may want their ads displayed with a piece of base content if one or more specific units are in the piece of base content. Or a sponsor may want a link to their site displayed with the piece of base content if one or more specific units are in the piece of base content. The advertiser, sponsor or the like would then "purchase" the unit to provide ad or sponsor link placement on a page with the base content. Further, the advertiser, the sponsor or the like, might even pay a fee every time the unit appears in a piece of base content and the advertiser's ad is displayed or the sponsor's link is displayed with the base content. Additional fees might also be collected from an advertiser or sponsor if a user selects (or "clicks") the ad or sponsor link.

Additional unit-extraction rules may be provided to the extraction module, for example, by the property servers, such as the Yahoo! property servers. These unit-extraction rules might provide for extracting units that are not in the unit-dictionary module or might provide that given units should not be extracted from parsed text although the given units are in the unit-dictionary module. The unit-extraction rules might include rules for extracting a unit based on an amount of revenue generation associated with the unit. For example, if a unit included in the unit-dictionary module has not been sold and does not have an associated revenue generation amount, the unit-extraction rules may provide for not extracting the unit from parsed text. According to another example, the revenue generation rules might provide for extracting units having a highest revenue generation amount. Different sets of unit-extraction rules might be provided by the various property servers. It should be understood that the unit-extraction rules discussed above are exemplary and not limiting. Those of skill in the art will recognize other useful extraction rules that might be included in a set of unit-extraction rules.

While the foregoing described embodiments provide for the extraction of units from base content, keywords might also be extracted from the base content based on a set of keyword-extraction rules. Similar to the unit-extraction rules, the keyword extraction rules may be provided to the parsing module in one or more configuration files 240. The keyword-extraction rules may be applied uniformly to all parsed text, or these rules may be applied to base content provided by a given web server and might not be applied to base content provided by other web servers. For example, one set of keyword-extraction rules might be applied to base content provided by the Yahoo! Music property and a different set of extraction rules may be applied to base content provided by the Yahoo! News property. The keyword extraction rules may include a variety of rules, such as those described above in the description of unit-extraction rules, or may contain other extraction rules.

Subsequent to the extraction of units 265 (including either single keyword units or multiple keyword units) from parsed-base text, the units are transferred to unit-ranking module 272 that is configured to rank the units. Units might be ranked based on a number of criteria including, for example, an amount of revenue generation and/or relevance scores associated with the units. An amount of revenue a unit generates might be based on an amount a subscriber, advertiser, sponsor, etc. is willing (e.g., contracted) to pay for their relevant content to be presented to a user along with a piece of base content. For example, a light-duty truck manufacturer may purchase/license the units "truck," "pick-up truck," and "light-duty truck." The unit light-duty truck may be highly relevant to the types of trucks produced by the manufacturer, whereas, the units pick-up truck and truck may be of less relevance. Accordingly, the manufacturer would typically pay a larger fee for their ads (i.e., relevant content) to be placed beside base content that includes the unit light-duty truck as compared with the fee paid for the placement of ads next to base content having the units pick-up truck or truck. Accordingly, the units pick-up truck and truck would have lower revenue-generation amounts than the unit light-duty truck.

Relevance scores indicate a degree of relevancy between units and users. A unit may be determined to be of relatively high relevance to a user if the unit appears greater than a given number of times in a piece of requested content or in queries a user uses to locate content. For example, the unit light-duty truck may be determined to be highly relevant to a user, if the user requests a relatively large number of a news article (e.g., web pages having articles about new pages) that includes the unit light-duty truck. It may be inferred that the user is interested in purchasing a light-duty truck. Accordingly, the relevance score for this unit might be relatively high for this user.

Relevance scores for units might also be based on other criteria, such as the number of times a unit appears in a piece of base content. Relatively high relevance scores may be associated with a unit if the unit is in a piece of base content greater than or equal to a given number of times. Further, a given unit may have a higher relevance score than other units, if the given unit is in the base content a greater number of times than the other unit.

Further, relevance scores may be based on the location of a unit in a piece of base content as prescribed by a rule supplied with configuration file 240 or by an indicator included in the base content. For example, a unit might have a high relevance score if the unit is in a title, metadata keywords, metadata description, anchor text, body text, is designated by formatting, such as bold, italics, and/or text characterized as important text by a rule supplied with configuration file 240 or by an indicator included in the base content. A unit that is a proper noun may be deemed important text and may be assigned a relatively high relevance score. Units deemed important units might be different depending on the particular property server that supplies the base content and configuration file to the parsing module. For example, a unit that includes the name of a sports team might be deemed an important unit for a sports property, but might not be deemed an important unit for a movie property.

According to one embodiment, units associated with a search term (e.g., a query) and search results 270 are transferred to parsing server 210 and assigned relevance scores by unit-ranking module 272. As described above, these units may include units a user enters in a search engine to locate information. These units might be ranked by the unit-ranking module according to at least one of a relevance score, a revenue generation amount, and/or an overall-relevance score (described below in detail). Relevance scores for units associated with searches may be based on a number of times a search is performed using the unit or may be based on a web page content (e.g., a number of times the unit is in this content) from web pages the user selects for use (e.g., viewing, listening, etc.). For example, if the unit is used a relatively large number of times in one or more searches, a relatively high relevance score may be assigned to this unit.

According to another embodiment, units from associated content 280, such as product related content, are transferred to parsing server 210. The units from associated content 280 might be transferred to the parsing server and assigned relevance scores by unit-ranking module 272. These units might also be ranked by the unit-ranking module as described above. Relevance scores for these units may be based on whether the provider of content-management system 200 makes a profit from sales associated with the associated content, such as selling music associated with other music the user purchases. For example, these units may be assigned relatively high relevance scores if a relatively large profit might be made, or may be assigned relatively low relevance score if relatively little or no profit is to be derived from the associated content. Relevance scores for these units might alternatively be based on whether the provider of content-management system 200 makes a profit from users clicking on links that launch a sales site associated with the associated content, or for displaying the sales site. These relevance scores might be based on similar criteria for sponsor links and whether the sponsor links are displayed, selected, and served, or whether sales are generated from linking to the sponsor sites. These relevance scores may alternatively be based on a number of other users who purchased products associated with the associated content. The foregoing relevance score determination techniques are described for exemplary purposes; those of skill in the art will recognize other useful techniques for generating relevance scores for these units.

According to one embodiment, relevance scores are varied as a function of time. For example, relevance score may be lowered with time. Specifically, based on an amount of time that has passed since a unit is transferred to the parsing server, the relevance score for the unit may be lowered. The relevance score may be decreased in steps or continuously decreased, and may be set to zero after a given amount of time. The amount relevance scores decrease with time might be different for different units. For example, the relevance scores for units that are associated with autos may be decreased linearly to zero in about a month from the time the units are received by the parsing server, whereas units associated with vacations may be decreased as a lower rate over a longer period of time (e.g., two to six months). It might be known, for example, from market research that users searching for autos typically buy an auto within about a month of their initial searches. And it might be know that users typically shop for vacations for a larger number of months (e.g., two to six months) before purchasing a vacation package.

FIG. 3 is an example user profile that might be generated by unit-ranking module 272 (or other module) and might be stored in a user-behavior database 285 according to an embodiment of the present invention. The user profile includes units associated with a user and includes a relevance score for each unit and includes a revenue generation amount for each unit. The revenue-generation amounts might be dollar values or indexed values and the relevance scores might have a range of zero to one inclusive (or other useful range). In the particular example of FIG. 3, the unit light-duty truck has a relatively high revenue generation amount (or dollar value) and a relatively high relevance score, whereas the units pick-up truck, truck, and car have relatively lower revenue-generation amounts and relatively lower relevance scores.

FIG. 4A is an example user profile that might be generated by unit-ranking module 272 (or other module) and might be stored in user-behavior database 285 according to another embodiment of the present invention. The user profile includes the units associated with the user, a relevance score for each unit, a revenue generation amount for each unit, and an overall relevance score for each unit. Overall-relevance scores are a metric of relevance of a unit to a user and might be based on a number of factors, such as the revenue-generation amounts, the relevance scores, or other metrics. For example, overall-relevance scores might be based on weighted-linear combinations of the revenue-generation amounts and the relevance scores. A formula for calculating overall-relevance scores for units might be written as:

$$ORS = W*RGA + (1-W)*RS,$$

wherein ORS is an overall-relevance score, W is a weighting factor, RGA is a revenue-generation amount, and RS is a relevance score. Weighting factors may be provided by the web server supplying the base content. For example, the weighting factors might be supplied to the content-management system in configuration files 240. Each web server might supply different weighting factors. For example, a news property might supply a weighting factor that places a relatively large emphasis on relevance scores as compared to revenue-generation amounts. Such emphasis may be placed on relevance scores as users of the news property may be more interested in obtaining related news articles rather than viewing ads and making purchases based on the content of a new article. Alternatively, a music property or a movie property might provide weighting factors that place relatively higher emphasis on a revenue-generation amount than on a relevance score. For example, users of music properties and movie properties may be more likely to purchase music or movies related to an article about music or a movie. According to one embodiment, unit-ranking module 272 is configured to generate overall-relevance scores for each unit in a user profile based, for example, on the ORS formula above.

FIG. 4B is an example of a user profile that might be generated by unit-ranking module 272 (or other module) and might be stored in user-behavior database 285 according to another embodiment of the present invention. The user profile includes the units associated with the user, the price per click (PPC) for each unit and the piece of additional content associated with the unit, the click-through rate (CTR) for each unit and the piece of additional content associated with the unit, and the relevance score for each unit. Specifically, the PPC includes the revenue generation amount for each piece of additional content the user selects (or clicks) for viewing, wherein the piece of additional content is associated with a unit in the user profile. Further, the click-through rate includes the predicted rate at which users who view an additional piece of content (ad, link, etc), selects (or clicks on) the additional piece of content to view the page or site associated with the additional piece of content (e.g., the page or site pointed at by a link (e.g., a hyperlink) included in the additional piece of content). The user profile might further include the revenue generation amount (RGA) for each unit and its associated additional piece of content. The RGA might be a function of the CTR and the PPC. For example, the RGA might be the CRT multiplied by the PPC (i.e., RGA=CRT*PPC). The foregoing described method for calculating the RGA provides that although a unit and its associated piece of additional content have a relatively high PPC, if the additional piece of content does not have a high click trough rate, then the RGA may be relatively low providing a relatively low ORS=W*RGA+(1-W)*RS. Alternatively, if a unit and its associated piece of additional content have a relatively low PPC, but have a relatively high CTR, then the RGE may be relatively high providing a relatively high ORS=W*RGA+(1-W)*RS. Therefore, revenue generation amounts may be relatively optimized while at the same time providing user relevant additional content. The CTR and RGA amount may be based on a statistically significant number of pageviews (e.g., 1000 pageviews) of page or site associated with a piece of additional content. The user profile shown in FIG. 4B might also include overall relevancy scores.

According to one embodiment, a user profile may be indexed in user-behavior database 285 according to a user-identification number 290. Each user may be assigned a unique user-identification number that might be randomly generated. User-identification number 290 may be stored in a bcookie 295 on client browser 20. According to one embodiment, the bcookie is transferred (for example in a URL) from client browser 20 to one or more of the web servers 205 each time a piece of base content (e.g., web page) is requested by the user via the client browser and is further transferred to the parsing server. The user-identification number supplied with the bcookie may be appended to a user profile (see FIGS. 3 and 4) by parsing module 210, or other module, for indexing use by the user profile once the user profile is stored in the user-behavior database. If a bcookie is not transferred from a client browser to the web servers when base content is requested, one or more of the of the web servers, at the time base content is requested, might generate a user-identification number for the client browser and place the user-identification number in a bcookie on the user's client browser.

According to one embodiment, additional content 230 that is relevant to a user is supplied by one or more of additional-content servers 215. For example, additional content might be supplied by an advertisement server 300, a sponsor links server 305, an integrated links server 310, an inside links server 315, or other server. Additional content supplied by the advertisement servers may be in the form of ads, such as banner ads, or links that point to ads. Additional content supplied by the sponsor links server, the integrated links server, and the inside links server might be in the form of links to the additional content. The links might include URLs, wherein the targets of the URLs point to the additional content to be supplied by these servers.

More specifically, sponsor links servers might provide sponsor links to sponsor sites and sponsor pages. The links might include URLs having targets that include the sponsor's web pages. Sponsors (and advertisers) typically purchase units that trigger the content-management system (e.g., the web servers) to request the sponsor links be published with web content (e.g., base content, e-mail, etc.) when the purchased units are in a user profile. Integrated link servers might provide integrated links to relevant content that is at an outside server or at a server associated with a provider of the content-management system. Integrated links might not be associated with revenue generation. For example, units that trigger the placement of an integrated link on a page might not be sold or licensed for the purpose of placing the integrated link on the page. Outside servers might not be affiliated with the provider of content management server 200. For example, the provider of content-management system 200 might be Yahoo!, and the outside server might be that of an independent news agency that provides news content or the like to Yahoo!. Outside servers might be crawled to build an index or database of relevant content and their units. Inside link servers might include inside links to web servers 205 (e.g., Yahoo! property servers) associated with a provider (e.g., Yahoo!) of content-management system 200. The web servers might include, for example, Yahoo! Launch, Yahoo! Finance, Yahoo! Movies, Yahoo! Health, Yahoo! News, Yahoo! Sports, Yahoo! Music, Yahoo! Weather or other property servers.

According to one embodiment, each piece of additional content 230 (from which relevant content is identified) is associated with at least one unit. For example, each advertisement supplied by an advertisement server, each piece of content associated with a sponsor link, an integrated link, and an inside link is associated with at least one unit. The additional content might be provided to parsing sensor 210 with one or more units, or the units may be extracted from the additional content or extracted from information associated with the additional content. For example, an advertiser may provide units with their advertisements to ensure that purchased units that might appear in a user profile, match units supplied with the advertiser's advertisements. Additional content that is not provided with units may be crawled to extract units. Additionally, the landing pages of links may be crawled for units. Also, the landing pages of advertisements might be crawled for units. Home pages associated with advertisements may also be crawled for units. Additionally, the URLs for advertisements and links may be parsed and units extracted from the parsed URLs. The units may be indexed and cached in memories associated with the respective additional-content servers or other memories. According to one embodiment, parsing server 210, or another parsing server that may be associated with the additional-content servers, may be configured to extract units from the additional content. The additional-content servers may schedule an appointment with the parsing server to have their additional content crawled for units. Scheduling may be periodic or may be established as the additional-content servers generate new content.

Figure 5:
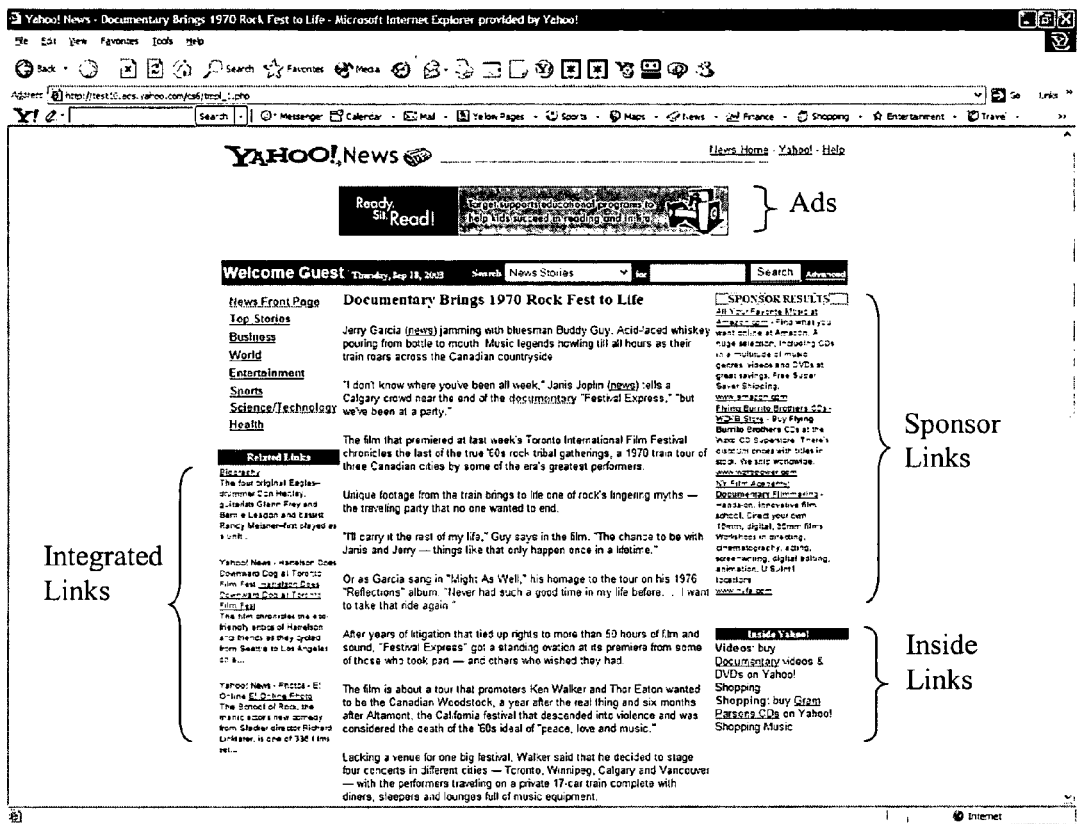
FIG. 5 is an example web page that might be published on a display of a client system and includes base content and relevant content according to one embodiment of the present invention.

Serving relevant content with web content, such as public content (e.g., base content) and/or private content (e.g., e-mail, chat-room discussion, etc.) is presently described in detail. FIG. 5 is an example web page that might be published on a display of client system 20 and includes base content 235 and relevant content 230 according to one embodiment of the present invention. The base content might include a news article, such as a news article about a music group. The base content may be provided by a property server, such as Yahoo! News or Yahoo! Music. The relevant content may include one or more advertisements, sponsor links, inside links, integrated links or the like. It should be understood that the web page shown in FIG. 5 is shown for exemplary purposes only and the web page may include other relevant content presented on the web page in a variety of formats, such as video, audio, pictures, text or the like.

According to one embodiment, relevant content is associated with a user, or more specifically, a user profile, before or at the time a user requests a piece of base content. Associations between relevant content and a user profile might be generated by a unit-matching module 320. Associations link a user profile to a piece of relevant content. The associations might data base links that are URLs that point to the user profile and the relevant content. An association between a user profile and a piece of relevant content might be formed if units in the user profile match the units associated with the piece of relevant content. For example, the unit light-duty truck may be in a user profile and may be associated with an advertisement and one or more links. As the unit light-duty truck is common to the user profile and the relevant content, an association is created between the user profile and the relevant content. According to another embodiment, associations between a user profile and relevant content are formed if their units are the same sets of related units. For example, a set of related units might include the units light-duty truck, pickup truck, and truck. An association may be formed between a user profile that includes the unit light-duty truck and an advertisement that includes the unit pick-up truck as these units are in the same set of related units. The associations may be used in real time to serve web content and relevant content. Alternatively, the associations between a user profile and relevant content may be cached in the user-behavior database or other memory for fast retrieval for serving the relevant content to the user. Cached associations may be stamped with a creation date and/or an expiration date. One or both of the dates may be used as an indicator for when the association should no longer be used.

According to one embodiment, one or more units in a user profile are compared with units associated with relevant content to determine whether these units match. For example, a unit having a highest overall-relevance score may be compared with units associated with relevant content. Or a number of units in a user profile having overall-relevance scores greater than or equal to a threshold score may be compared with units associated with relevant content to determine whether matches exist among these units. Providing for comparison of units having relatively high relevance scores, may provide that the user receives ads that are of relatively high user relevance and might generate sales for the advertisers and/or sponsors. Providing such comparison may also provide that profits may be optimized for a service provider as ads having relatively high user relevance and relatively high revenue generation amounts are served to a user. For example, revenue generation might be substantially optimized as ads having a highest-revenue generation amount or a relatively high generation amount, but having relatively low user relevancy might not be served to the user. That is, an ad with a high revenue generation amount, but which is not relevant to a user might not be selected be the user and might not generate revenue for the provider of system 200 (FIG. 2) regardless of the revenue generation amount associated with the ad.

According to one embodiment, click through rates are accumulated for relevant content served with base content, and based on the click through rates a web page presentation of the base content and relevant content is changed. As referred to herein, a click through rate is a number of times a piece of relevant content is selected for use by a user in view of the number of time the relevant content is served to the user. If a given piece of relevant content has a higher click through rate than another piece of relevant content, the given piece of relevant content may be published in a more prominent position on subsequently published web pages. For example, the given piece of relevant content may be placed higher on a list than the other relevant content. Alternatively, the given piece of relevant content may supplant other relevant content when the web page is published.

Figure 6:
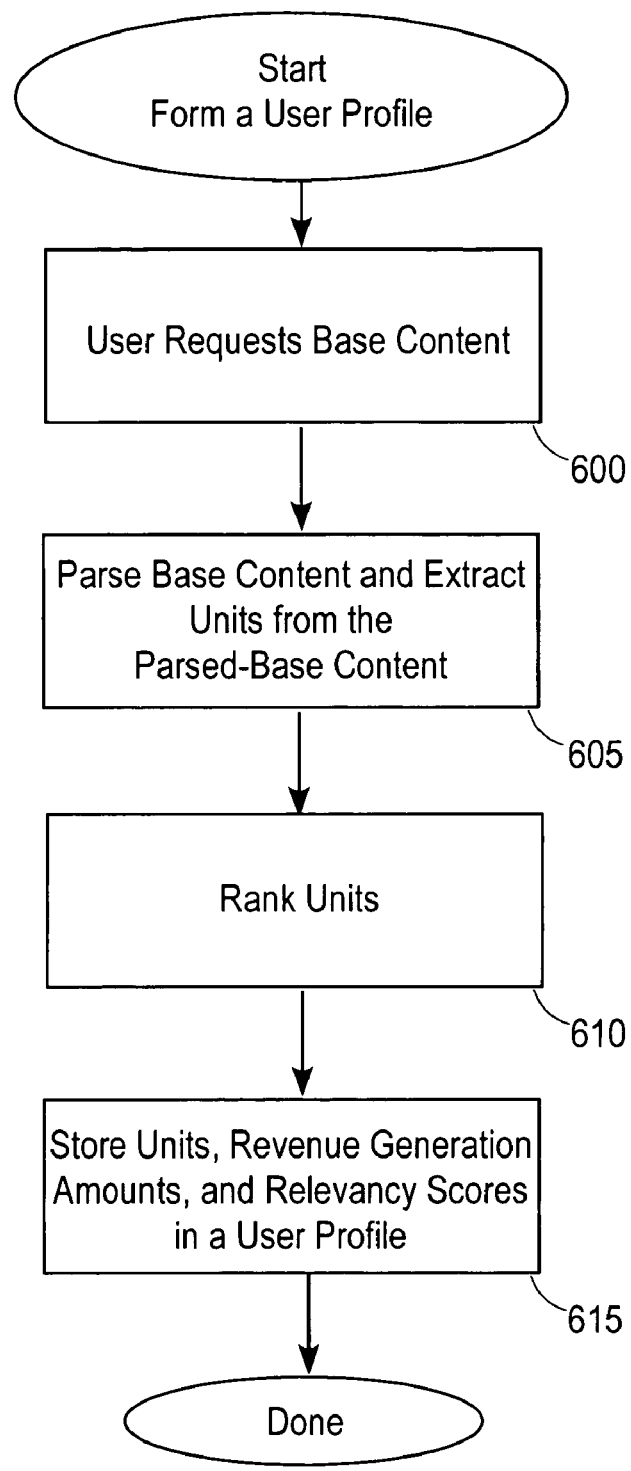
FIG. 6 is a high-level flowchart having steps for forming a user profile based on web pages viewed by a user according to an embodiment of the present invention.

FIG. 6 is a high-level flowchart having steps for forming a user profile based on web pages viewed by a user according to an embodiment of the present invention. The high-level flowchart is merely illustrative of an embodiment incorporating the present invention and does not limit the scope of the invention as recited in the claims. One of ordinary skill in the art would recognize variations, modifications, and alternatives that incorporate the spirit and purview of the illustrative embodiment. At 600, a user using, for example, a client browser, requests a piece of base content from a web server. With the request, a user-identification number is retrieved from a bcookie that is stored on the user's browser and is transferred to the web server, such as in a URL or the like. If the bcookie is not transferred to the web servers, one or more of the web servers place a bcookie on the client browser, such that the bcookie includes a unique user-identification number assigned to the client browser. At 605, the base content requested by the user is parsed to generate parsed-based content and units are extracted from the parsed-base content. The units might be extracted based on a set of unit-extraction rules and/or a unit-dictionary module that might include units that might be extracted from the parsed text.

At 610, the units extracted from the parsed-base content are ranked, for example according to relevance scores (e.g., a metric of relevance of a unit to the user) and/or revenue-generation amounts. A relevance score may be compared to a revenue generation amount according to one or more formulas, to provide additional content to the user that is relevant to the user and thereby likely to generate revenue regardless of whether the additional content is associated with a highest possible revenue generation amount or a relatively high revenue generation amount. The idea being that additional content not selected by the user for lack of relevancy is likely to generate little or no revenue regardless of whether the additional content is associated with a highest or relatively high revenue generation amount. Moreover, serving additional content that is highly relevant to the user, but that has little or no revenue generation values might also generate little or no revenue. One method for substantially optimizing revenue includes generating the product of a revenue generation amount and a relevancy score and serving the additional content if the product is within a predetermined window. Other formula that might be used to substantially optimize revenue generation amounts include weighted sum formula or the like (described above in detail). Those of skill in the art will know of a number of methods for optimizing revenue generation and are considered to be within the scope and prevue of the present invention.

According to some embodiments, units are ranked according to overall-relevance scores that might be a function of the relevance scores and the revenue-generation amounts. At 615, the units and their associated relevance scores and revenue-generation amounts are stored in a user profile in a user-behavior database. According to one embodiment, overall-relevance scores are also stored in the user profile. The user profile may be indexed in the user-behavior database, based on the user-identification number supplied to the web servers from the user's bcookie. According to one embodiment, rather than, or in addition to, extracting units from base content, units may be collected from user searches, for example using a search engine, and may be collected from associated content that is associated with primary content requested by the user.

Figure 7:
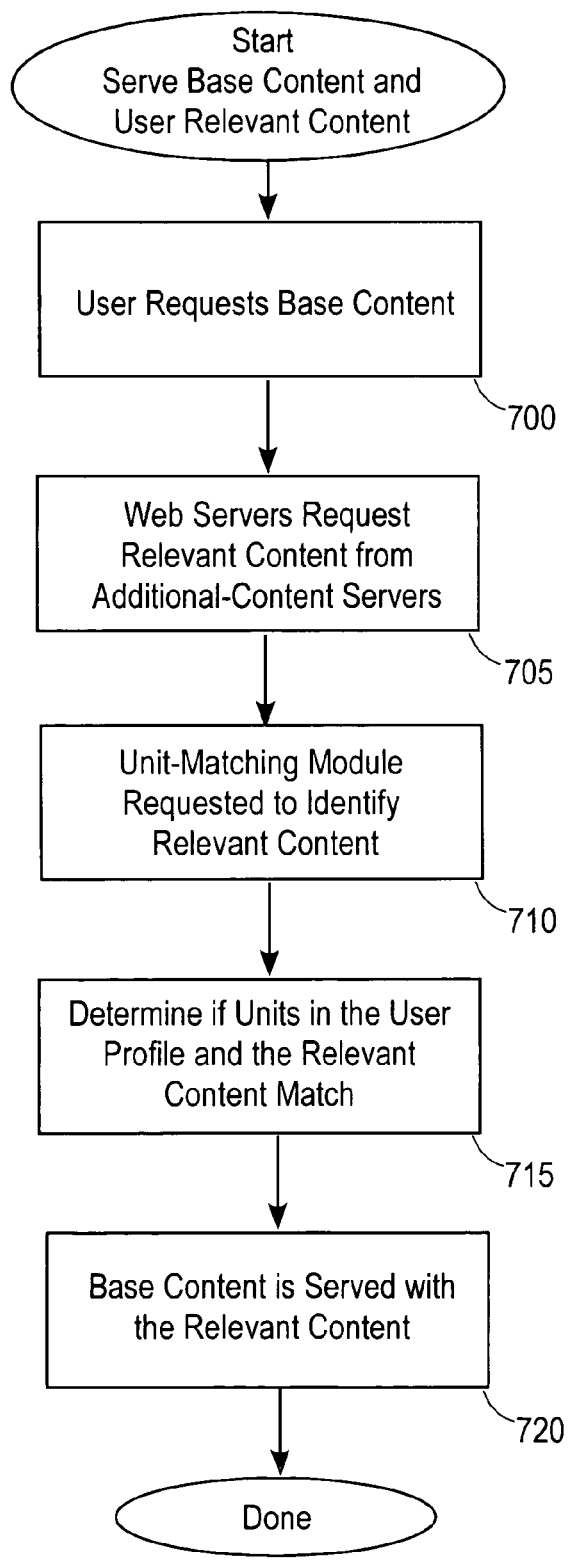
FIG. 7 is a high-level flowchart having steps for serving web content and relevant content that is relevant to a user based on the web pages viewed by the user according to another embodiment of the present invention.

FIG. 7 is a high-level flowchart having steps for serving web content and relevant content that is relevant to a user based on the web pages viewed by the user according to another embodiment of the present invention. The high-level flowchart is merely illustrative of an embodiment incorporating the present invention and does not limit the scope of the invention as recited in the claims. One of ordinary skill in the art would recognize variations, modifications, and alternatives that incorporate the spirit and purview of the illustrative embodiment.

At 700, a user using, for example, a client browser requests a piece of content from one or more web servers. The requested content might include public content or private content. Public content might include web content, such as web pages or the like, that are accessible by the public, for example, without password protection, fee payment, or the like. Private content might include web content, such as web pages or the like, that is of a personal nature and may be protected by password, encryption, fee access, or may be in a "chat room," "discussion group," might be VOIP (voice over Internet protocol), e-mail sending, storing, and/or reception or other network (e.g., Internet) use that is of a private nature. At 705, one or more web servers issue a request (for example in a URL or the like) to one or more additional-content servers (e.g., an ad server, a sponsor server, an integrated server, an inside server, etc.) to serve additional content (e.g., ads, sponsor links, integrated lings, inside links, etc.) to the web servers, such that the additional content might be relevant to the user requesting the content.

At 710, one or more of the additional-content servers issue a request to a unit-matching module to identify additional content that is relevant to the user. At 715, the unit-matching module is configured to compare units in a user profile with units associated with the additional content, and determine whether any of the units match. According to one embodiment, the unit-matching module is configured to compare a unit from the user profile having a highest overall-relevance score, or compare one or more units from the user profile having overall-relevance scores greater than or equal to a threshold score. The additional content might include ads provided by an ad database server, sponsor content provided by a sponsor server, integrated content provided by an integrated server, and/or inside content provided by an inside server. The sponsor content provided by a sponsor server, integrated content provided by an integrated server, and/or inside content provided by an inside server might be pointed at by links, such as URLs, the targets of which are the content. If the units in the user profile and the units in the additional content match or are sufficiently similar (e.g., assigned to a common set), the additional content is deemed relevant content that is relevant to the user. One or more associations (e.g., database links, URLs, etc.) might be formed between the user profile and the relevant content. The formed associations may be used to serve the relevant content to the user, such as a human user using a client browser 20.

At 720, the relevant content is served to the user with other content that might include public content and/or private content. The additional-content servers might serve the additional content to the one or more web servers configured to serve the relevant content to the user's client browser. The relevant content might be served to the web servers and to the client browser in a protocol usable for content-management systems, such as the Hypertext Transport Protocol (HTTP) or other protocol in use at the time. At any given time the web servers, parsing servers, and additional-content servers may behave as HTTP clients or HTTP servers, and may send Uniform Resource Locators (URLs) to request content, and receive content in HTTP or the like The foregoing described steps outlined in FIG. 6 and FIG. 7 may be executed in real time as base content is requested by a user. That is, content-management system 200 may generate associations between a user profile and relevant content in real time as base content is requested by a user, and the relevant content and the base content may be served to the user's client browser. Alternatively, the steps may be executed asynchronously. That is, content-management system 200 may generate associations between user content and relevant content and cache the associations prior to receiving a user's request for base content. The cached associations may subsequently be used to serve the relevant content to the user at the time the user requests web content, such as base content, e-mail content, or the like. Cached associations may be saved in the user-behavior database in a user profile or in other databases.

Figure 8:
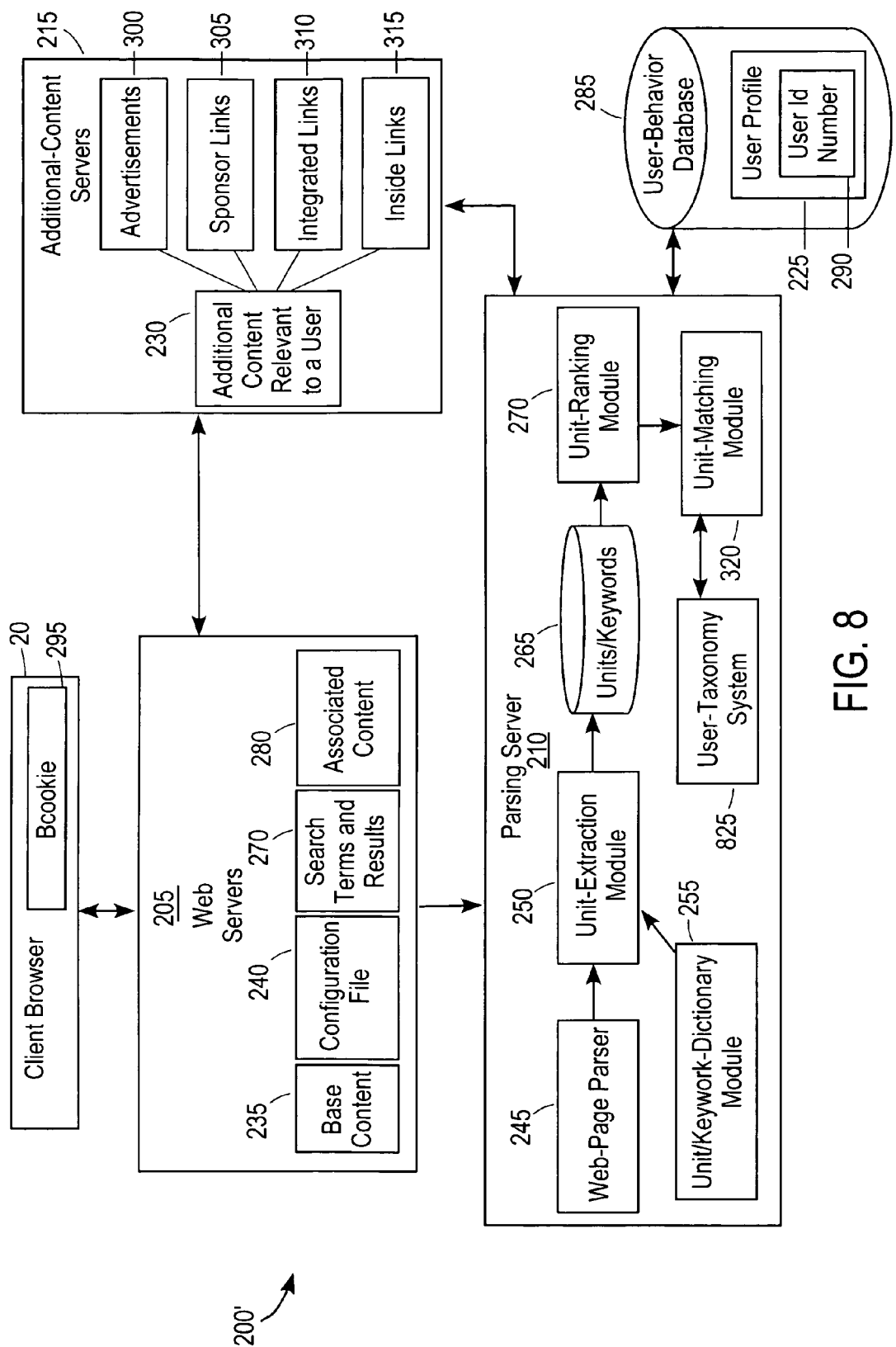
FIG. 8 is a simplified illustration of a content-management system that includes a unit-taxonomy scheme according to one embodiment of the present invention.
Figure 9:
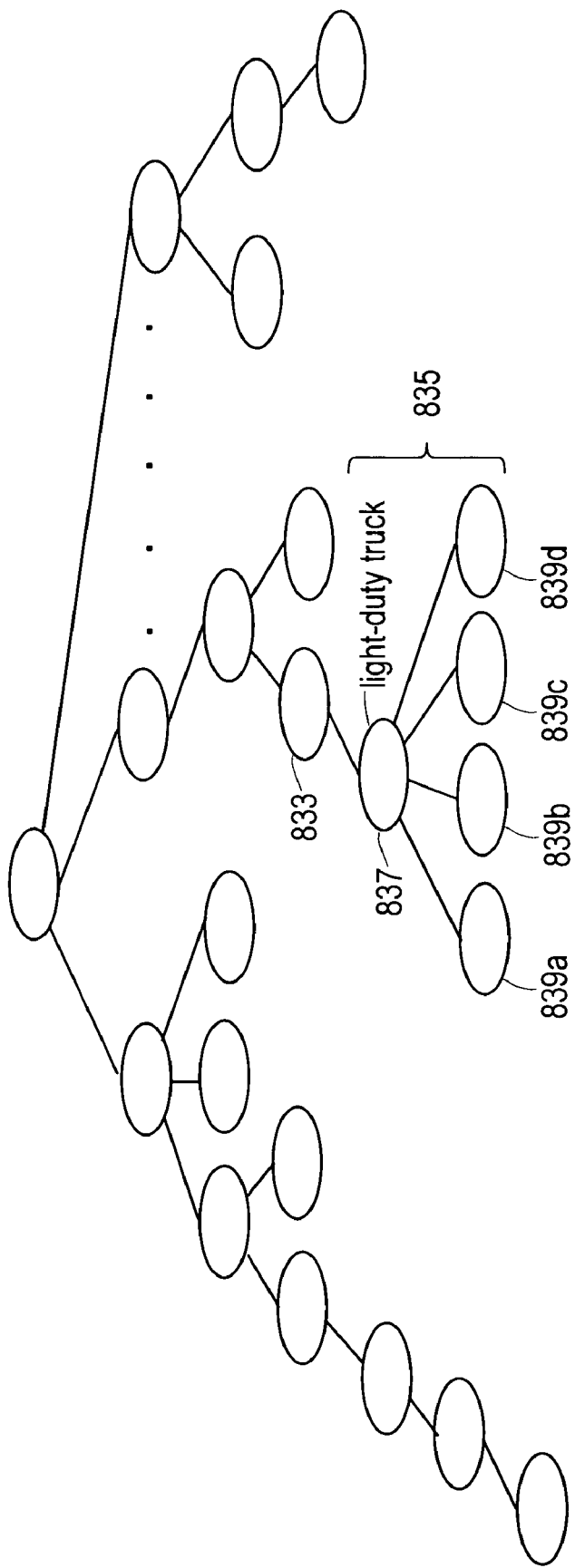
FIG. 9 is a simplified illustration of a "tree" structure of the unit-taxonomy system.

According to one embodiment, each unit in the user's user profile is associated with a unit-taxonomy system 825 (FIG. 8) that includes category information for these units. The category information (e.g., category names) identifies categories within the unit-taxonomy system to which the units are assigned. Categories in the unit-taxonomy system may be organized in a "tree" structure (FIG. 9), wherein a higher lever category 833 may include a set of one or more lower level categories 835. Units may be assigned to a plurality of categories in the unit-taxonomy system. For example, a unit that is assigned to a lower level category 837 is said to be assigned to any higher level category 833 that includes the lower level category. The unit-taxonomy system may be a predefined system that might be computer generated, human generated or a combination thereof. Units may be pre-assigned to the categories in logical manner by the mentioned computer, person, or combination thereof.

Parsing server 210 (e.g., unit-extraction module 250 included in the parsing server) or the like is configured to compare the units in the user profile with the units assigned to the categories of the unit-taxonomy system. If the units in the user profile match or are substantially similar (e.g., synonyms, derivatives, etc) to the units in a given category, category information for this given category is associated with the user via the user profile. For example, this category information (e.g., category name) might be stored in the user profile. Particularly, the parsing server is configured to determine the "lowest" level categories that include the units in the user profile. The lowest-level category is the lowest category on a branch of the tree structure of the unit-taxonomy system that includes a particular unit. Any other category that might be included in the lowest-level category does not include the particular unit. For example, the unit light-duty truck is assigned to category 837 (i.e., a lowest-level category), and hence is also assigned to category 833, but is not assigned to categories 839a-839d that are included in category 837.

According to one embodiment, the units extracted from, or otherwise associated with, the additional content 230 are compared with the units in the categories of the unit-taxonomy system. A category is associated with a piece of additional content if the category include units that are associated with the piece of additional content (e.g., an advertisement, a sponsor link, an integrated link, and/or an inside link).

According to one embodiment, the category information used to identify a category may be placed in the content metadata or otherwise associated with the content. According to some embodiments, the additional content is pre-associated with one or more categories. The pre-association may be generated by a computer system or a human.

According to one embodiment, the unit-matching module 320 or other module is configured to compare the category information stored in the user profile 225 with the category information for various pieces of additional content. If one or more categories in the user profile and the additional content match, the additional content is deemed relevant to the user, and may served with a piece of base content requested by the user. Therefore, even if the units and/or keywords in the user profile do not match the units and/or keywords associated with the additional content, but these units and/or keywords are associated with each other via the unit-taxonomy system, and more specifically via category assignment, then additional content may still be identified that is relevant to the user and may be served to the user.

Categories assigned to the user profile may be assigned relevance scores and thereby ranked for user relevancy similar to the units assigned to the user profile (described above in detail). For example, relevance scores assigned to units may be assigned to the categories that include the units. Alternatively, if a category in the user profile includes a number of units, the relevance score for this category may be a function (e.g., an average) of the relevance scores of these units. If one or more categories in the user profile match one or more categories of the additional content, then a highest ranking (e.g., highest relevance score) category may be used for selecting the additional content served to the user.

Revenue generation amount might be assigned to the categories associated with the additional content. The unit matching module may identify matching categories for the user profile and the additional content for which the categories for the additional content have a highest revenue amount. According to an alternative embodiment, the unit-matching module might use a formula that takes into account both the relevance scores for categories in the user profile, and the revenue generation amount for categories for the additional content, to serve additional content to the user such that revenue generation is substantially optimized for a category the has a relatively high relevance to the user. That is, additional content that is of relatively low relevance to the user might not be served to the user merely because the additional content has a high revenue generation amount. Ultimately, if the user has little interest in the additional content, the user is not likely to click on the additional content and little or no revenue will likely be generated from this additional content regardless of whether the additional content has a relatively high revenue generation amount.

Figure 10:
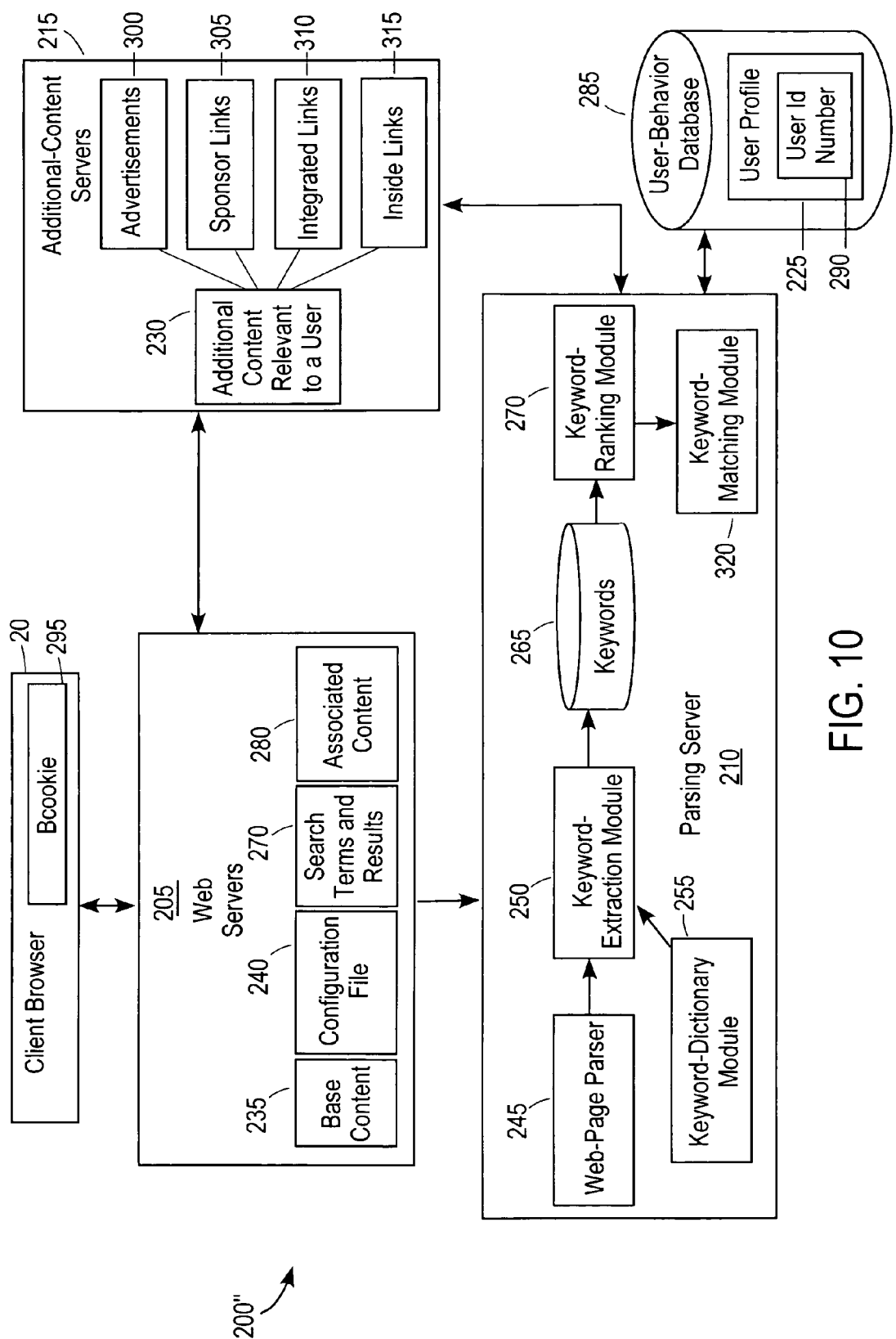
FIG. 10 is an illustration of a content-management system according to another embodiment of the present invention.

It is to be understood that the examples and embodiments described above are for illustrative purposes only and that various modifications or changes in light thereof will be suggested to persons skilled in the art and are to be included within the spirit and purview of this application and scope of the appended claims. For example, while, embodiments of content-management systems described herein have been characterized as including a unit dictionary supplied by a query-processing engine, units may be supplied from other sources. Additionally, keywords rather than, or in combination with, units might be used for embodiments of the present invention, for example, with keywords extracted from base content to generate user profiles and extracted from relevant content for comparison by a keyword-matching module. See for example FIG. 10, which shows a content-management system 200" that includes a keyword-extraction module, a keyword-matching module, a keyword-dictionary module, and a keyword-matching module as compared to embodiment described above that are configured to use units.

Further, while users have been generally described herein as human users that interact with a user interface of a computer that processes requests for base content, it might be the case that the user is a computer process or a computer system that generates a request for base content programmatically. In this latter instance, it is likely that the requesting user will also programmatically process the results of the request for base content, but it might instead be the case that the computer process and/or computer system makes a request for base content and a human user is the ultimate recipient of the content. Therefore, the above description should not be taken as limiting the scope of the invention as defined by the claims.

What is claimed is:

1. A system configured to serve base content and relevant content to a user system based on an association of a user profile and the relevant content, such that the relevant content is relevant to a user, the system comprising:
a plurality of web servers configured to serve the base content and the relevant content to the user system;
a set of additional-content servers configured to serve the relevant content to the web servers if units in the user profile match units associated with the relevant content;
a parsing server configured to, in response to a request for the base content from the user, extract the units from the base content requested by the user and after extraction of the units, generate the user profile on the basis of the units extracted from the base content requested by the user, generate a ranked list of the units in the user profile that are in the base content based on at least one of a relevance score and a revenue-generation amount for each unit in the user profile and calculate overall-relevance score for the units in the user profile based on the relevance scores and the revenue-generation amounts; and
a unit-matching module configured to determine whether the units in the user profile, having overall-relevance scores greater than or equal to a threshold score, match units associated with the relevant content if the user requests the base content, wherein the web servers are configured to serve the base content and the relevant content if the units in the user profile match units associated with the relevant content.

2. The system of claim 1, wherein the parsing server includes:
a parsing module configured to parse the base content to generate parsed-base content;
a unit-extraction module configured to extract the units in the user profile from the parsed-base content; and
a unit-ranking module configured to generate the ranked list of the units in the user profile.

3. The system of claim 1, wherein the web servers are configured to transfer to the parsing module units for associated content that is associated with primary content.

4. The system of claim 3, wherein the primary content includes the base content, and the web servers are configured to serve the relevant content with private content.

5. The system of claim 4, wherein the private content includes at least one of e-mail and chat-room discussion.

6. The system of claim 1, wherein:
the ranked list includes a relevance score for each units in the user profile, and a revenue-generation amount for each unit in the user profile, and
the units in the user profile are ranked based on at least one the relevance scores and revenue-generation amounts.

7. The system of claim 1, wherein the overall-relevance scores are generated according to the formula:

$$ORS = W*RGA + (1-W)*RS,$$

wherein ORS is an overall-relevance score, W is a weighting factor, RGA is a revenue-generation amount, and RS is a relevance score.

8. The system of claim 7, wherein the RGA is based on a price per click (PPC) and a click through rate (CTR) for the relevant content.

9. The system of claim 8, wherein the RGA=CTR*PPC.

10. The system of claim 1, wherein the unit-matching module is configured to generate an association between the user profile and the relevant content if the units in the user profile match units associated with the relevant content.

11. The system of claim 1, further comprises:
a database configured to store the user profile, wherein the user profile is indexed in the database by a user-identification number; and
a browser cookie configured to be stored on the user system and configured to store the user-identification number.

12. The system of claim 1, wherein the web servers are configured to serve the base content and the relevant content if the units in the user profile match units associated with the relevant content or if the units in the user profile and the units associated with the relevant content are in a same set of units.

13. The system of claim 1, further comprising a unit-dictionary module configured to include a list of all units that is extractable from the base content.

14. A system configured to associate a user profile with relevant content, the system comprising:
- a parsing module, executed on a parsing server, configured to parse base content requested by a user and to generate parsed-base content;
- a unit-dictionary module including a plurality of units;
- a unit-extraction module, executed on the parsing server, configured to in response to a request for the base content from the user, extract units included in the unit dictionary from the parsed base content, the units extracted from the parsed-base content are referred to as the extracted-units;
- a unit-ranking module, executed on the parsing server, configured to rank the extracted-units, after extraction of the units, based on at least one of relevance scores and revenue-generation amounts respectively associated with the extracted-units, and to generate a ranked list of extracted-units that are in the base content and calculate overall-relevance scores for the units in the user profile based on the relevance scores and the revenue-generation amounts;
- a user profile associated with the user generated on the basis of the extracted-units and including the ranked list with overall-relevance scores for the units in the user profile; and
- a unit-matching module configured to generate an association between the user profile and the relevant content if the extracted-units in the ranked lists, having overall-relevance scores greater than or equal to a threshold score, and units associated with the relevant content match.

15. The system of claim 14, wherein the unit-matching module is configured to generate the association between the base content and the relevant content if a highest ranking extracted it and at least one of the units associated with the relevant content match or are in a same set of related units.

16. The system of claim 14, further comprising a plurality of web servers configured to serve to a client browser the base content and the relevant content based on the association.

17. The system of claim 16, wherein the base content and the relevant content configured to be served on a web page of a client browser.

18. The system of claim 14, wherein the relevant content includes advertisements and/or is pointed at by a set of links that is configured to be served with the base content, and the set of links includes at least one of a sponsor link, an integrated link, and an inside link.

19. The system of claim 14, further comprising at least one web server configured to provide a configuration file to the parsing module, wherein the configuration file includes a set of parsing rules for parsing base content.

20. The system of claim 19, wherein the configuration file includes weighting factors for the relevance scores and the revenue generation amounts.

21. The system of claim 19, wherein the parsing rules provide for parsing at least one of a title, metadata keywords, a metadata description, anchor text, body text, proper nouns, formatted text.

22. The system of claim 21, wherein the formatted text includes at least one of bold text and italicized text.

23. The system of claim 21, wherein the parsing rules further provide for parsing text characterized as important text by an indication in the base content.

24. The system of claim 14, wherein the unit-matching module is further configured to determine if extracted units having overall-relevance scores greater than or equal to a threshold score and at least one of the units associated with the relevant content match.

25. The system of claim 1, wherein if the user requests the base content, the relevant content and the base content are served to the user system based on the association.

26. The system of claim 1, wherein the relevant content includes advertisements and is pointed at by a set of links that is served with the base content, and the set of links includes at least one of a sponsor link, an integrated link, and an inside link.

27. A method for serving web content and relevant content that is relevant to a user, the method comprising:
- requesting base content from a computer network;
- extracting a set of units from the base content, the units are referred to as the extracted units;
- assigning the extracted units respective relevance scores and revenue-generation amounts;
- after extracting the set of units, ranking the extracted units based on at least one of the relevance scores and the revenue-generation amounts;
- forming a user profile on the basis of the extracted units that includes a ranked list of the extracted units, the relevance scores, and the revenue generation amounts, the ranked list of extracted units being content associated with the base content;
- calculating overall-relevance scores for the units in the user profile based on the revenue-generation amounts and the relevance scores;
- forming at least one association between the user profile and the relevant content if at least one of the extracted-units in the user profile, having an overall-relevance score greater than or equal to a threshold score, matches at least one of the its associated with the relevant content;
- caching the association in a memory;
- retrieving the association from the memory, if the user requests the web content; and thereafter
- serving the base content with the relevant content.

28. The method of claim 27, further comprising parsing the base content to generate parsed-base content, wherein the step of extracting the set of units from the base content includes extracting the set of units from the parsed-base content.

29. The method of claim 27, further comprising storing the user profile in a user-behavior database.

30. The method of claim 29, further comprising
- if the user requests the web content, retrieving the user profile from the user-behavior database; and thereafter
- serving the web content with the relevant content if at least one of the extracted-units and at least one of the units associated with the relevant content match.

31. The method of claim 27, wherein the web content includes private content and public content.

32. The method of claim 31, wherein the private content includes at least one of an e-mail and chat-room discussion.

33. The method of claim 31, wherein the public content includes web page content.

34. The method of claim 27, further comprising extracting the extracted units from the base content based on a set of units in a unit-dictionary module.

35. The method of claim 27, wherein the relevant content includes advertisements.

36. The method of claim 27, wherein the relevant content is pointed at by a set of links that is served with the base content.

37. The method of claim 36, wherein the set of links includes at least one of a sponsor link, an integrated link, and an inside link.

38. The method of claim 27, wherein the ranking step includes determining if a unit in the user profile having a highest overall-relevance score matches at least one of the units associated with the relevant content.

* * * * *